United States Patent [19]

Monser

[11] 3,781,895

[45] Dec. 25, 1973

[54] COMBINED PITOT TUBE AND ANTENNA

[75] Inventor: George J. Monser, Santa Barbara, Calif.

[73] Assignee: Raytheon Company, Lexington, Mass.

[22] Filed: Nov. 22, 1972

[21] Appl. No.: 309,312

[52] U.S. Cl. .............................. 343/708, 343/720
[51] Int. Cl. ............................................ H01q 1/28
[58] Field of Search ................. 343/705, 708, 720

[56] References Cited
UNITED STATES PATENTS
2,814,800  11/1957  Martin et al. ..................... 343/708
2,820,964  1/1958  Lyle ................................... 343/708

Primary Examiner—Eli Lieberman
Attorney—Philip J. McFarland et al.

[57] ABSTRACT

An antenna structure for use on a jet aircraft in the VHF band is shown. The particular structure illustrated is also the housing for a Pitot tube mounted on the aircraft. Such housing is electrically insulated from the fuselage of the aircraft and capacitively coupled to a coaxial transmission line so that it may become an active antenna element without affecting the aerodynamic characteristics of the aircraft.

2 Claims, 2 Drawing Figures

PATENTED DEC 25 1973  3,781,895

COMBINED PITOT TUBE AND ANTENNA

BACKGROUND OF THE INVENTION

This invention pertains generally to antennas for use in jet aircraft and particularly to an antenna for such an aircraft which carries a Pitot tube.

It is known in the art that the support structure for a Pitot tube may also be used to support a dipole antenna. The structural configuration of such an antenna may be such as to provide a substantially nondirectional radiation pattern over a relatively broad band of UHF frequencies. It is necessary, however, that conventional antennas be provided for wavelengths in the VHF band. The reason for this is that dipole elements supported in any known Pitot tube are physically too small to operate in the VHF band with any acceptable efficiency. Consequently, it is necessary that any desired VHF antennas be incorporated in an assembly within an aircraft or be permitted to protrude from the skin of the aircraft. Either alternative is undesirable to some degree. The former entails modification of the aircraft to accommodate antenna elements of the requisite size, while the latter detracts from the aerodynamic integrity of the aircraft.

Therefore, it is a primary object of this invention to provide an improved VHF antenna for use in a jet aircraft, the improved antenna having no effect on the aerodynamic integrity of the aircraft.

Another object of this invention is to provide an improved VHF antenna having radiating elements common to elements of a Pitot tube carried by such aircraft.

SUMMARY OF THE INVENTION

These and other objects of this invention are provided generally by electrically isolating the housing of a Pitot tube from the fuselage of an aircraft and then capacitively coupling such isolated housing to a coaxial line connected to a VHF transmitter/receiver.

The isolated housing of the Pitot tube then corresponds to the active element of a VHF antenna and portions of the skin of the aircraft adjacent to such housing correspond to the passive element of such an antenna. With a Pitot tube assembly mounted in the inlet duct of a jet engine, a directional radiation field may be so formed over a frequency range of, say, 70 to 220 MHz.

BRIEF DESCRIPTION OF THE DRAWINGS

For a more complete understanding of this invention reference is now made to the following description of a preferred embodiment of this invention as illustrated in the accompanying drawings wherein.

DESCRIPTION OF THE PREFERRED EMBODIMENTS

Figure 1:
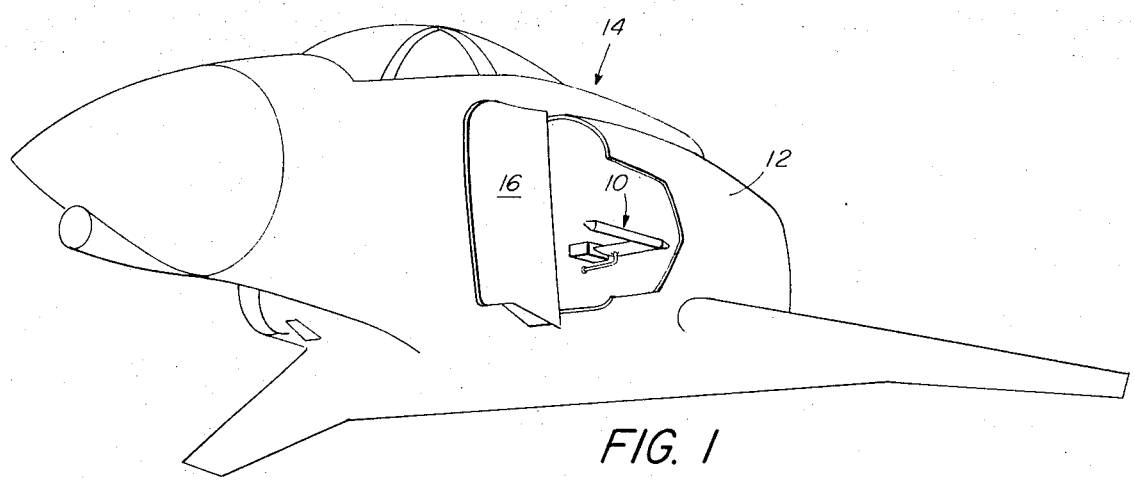
FIG. 1 is a sketch illustrating a Pitot tube assembly, modified as contemplated by this invention, mounted in the air inlet duct of a jet engine.

Referring now to FIG. 1 it may be seen that a Pitot tube assembly 10 mounted in the air intake duct 12 of a jet engine may be used as the active element of an antenna according to the principles of this invention. An air control flap 16 (provided to control the size of the air intake duct 12) and the air intake duct 12 serve as the passive elements of the antenna. The coverage of the antenna pattern from such an antenna obviously is concentrated in the quadrant defined by the longitudinal centerline of an aircraft 14 and its port wing. A similar Pitot tube assembly in the air intake duct of the starboard engine would, of course, provide coverage in the forward starboard quadrant.

Figure 2:
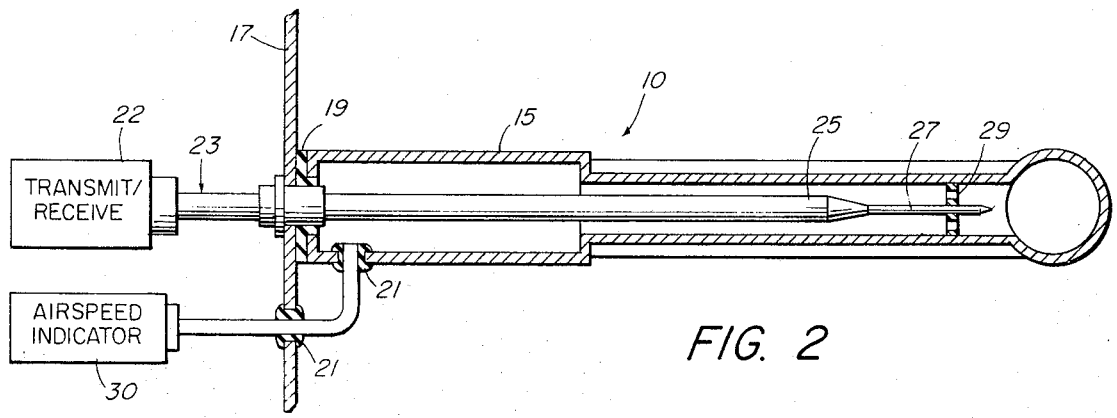
FIG. 2 is a cross-sectional view of the modified Pitot tube assembly of FIG. 1.

In order that the housing 15 of the Pitot tube 10 may serve as the active element of an antenna, it is, of course, necessary that such housing be electrically insulated from the fuselage 17 of the aircraft 14 and that a way be provided to couple energy to such housing. Thus, in FIG. 2 it may be seen that the housing is electrically separated from the fuselage 17 by a layer of an electrical insulator 19 and electrically insulating grommets 21. Radio frequency energy is fed to the housing 15 from a transmitter/receiver 22 through a coaxial line 23. Such line extends into the interior of the housing 15, its covering 25 being partially removed to expose a portion of its center conductor 27. An insulator 29 supports the exposed center conductor 27 as shown. It will be observed that the housing 15 is, by reason of the arrangement just described, capacitively coupled to the transmission line 23. Therefore, radio frequency energy may be passed between the transmission line 23 and the housing 15.

The frequency band covered by the just described combined Pitot tube assembly and antenna is here determined primarily by the physical dimensions of the housing 15 and the intake air duct 12. It has been found that, without changing the size or shape of either a conventional Pitot tube or the intake air duct, the disclosed antenna provides satisfactory coverage in the VHF frequency band, i.e., from about 70 to 220 MHz.

The limits of the band of frequencies are determined by the physical size of the Pitot tube assembly 10. Obviously, however, the position of the air control flap 16 will have some effect on the shape of the antenna pattern. Fortunately, however, the air control flap 16 is usually in its open position so that, in practice, the effect of the position of the air control flap 16 on the antenna pattern may be disregarded.

Having described a preferred embodiment of this invention, it will now be apparent to one of skill in the art that changes may be made without departing from my inventive concepts. Thus, it is evident that the Pitot tube housing could be made from a material such as anodized aluminum to provide an insulating layer in place of the electrical insulator 19 and grommets 21. It is felt, therefore, that this invention should not be restricted to its disclosed embodiment but rather should be limited only by the spirit and scope of the appended claims.

What is claimed is:

1. In a jet aircraft provided with a Pitot tube assembly mounted within an air intake duct to a jet engine, the improvement comprising:
   a. means for electrically insulating the housing of the Pitot tube assembly from the walls of the air intake duct; and,
   b. means for coupling such housing to a radio frequency transmitter/receiver.

2. The improvement as claimed in claim 1 wherein the second named means includes a coaxial line from the radio frequency transmitter/receiver, the free end of such line being supported within the housing to effect capacitive coupling between such housing and transmitter/receiver.

* * * * *